3,247,001
FUSED CAST REFRACTORY

Allen M. Alper, Corning, and Robert N. McNally, Horseheads, N.Y., assignors to Corhart Refractories Company, Inc., Louisville, Ky., a corporation of Delaware
No Drawing. Filed Apr. 18, 1962, Ser. No. 188,566
5 Claims. (Cl. 106—63)

This application is a continuation-in-part of our copending application Serial No. 140,775 filed September 26, 1961, and now abandoned.

This invention relates to the production of an improved fused cast alumina refractory having an exceptionally high degree of resistance to spalling when subjected to thermal shock and/or to repeated temperature changes in the range between room temperature and about 1700° C. As is well known, fused cast refractory is the type of refractory which is produced by melting a mass of refractory material of the desired composition, casting and cooling the molten refractory material to form a solidified refractory mass.

Fused cast, substantially pure alumina refractory is known to possess a very substantial resistance to hot load deformation (refractoriness), which is very desirable for many furnace refractory applications. However, it has been found that the fused cast, substantially pure alumina refractory has a highly oriented structure which is very susceptible to cracking and spalling in furnace applications where it is subjected to thermal shock conditions during normal furnace operations. This type of thermal shock occurs where the refractory is heated and/or cooled relatively rapidly, e.g., between about room temperature and temperatures about 1600° C. and higher. The oriented structure of this refractory is characterized by a pattern of elongated crystals of corundum mutually oriented substantially perpendicular to each face of the refractory casting and in which many large elongated void spaces exist between the mutually oriented crystals. It has been observed that, when this oriented refractory is subjected to thermal shock, the thermal stresses developed cause surface cracks to open along planes of crystal intergrowth and are found to be extensions of the internal elongated void spaces. These cracks propagate quite rapidly through a casting resulting in one or more chunks or portions of the casting being spalled.

It has been found that the degree of weak, oriented, structure can be lessened and the ability to withstand thermal shock substantially improved by melting small quantities of magnesia together with the alumina, e.g. 0.5% to 8% MgO by weight of the whole refractory. The structure of this refractory is characterized by lesser amounts of mutually oriented, elongated corundum crystals, located mainly adjacent the surfaces of the casting, and by randomly oriented and mixed smaller, interlocking crystals of corundum and spinel ($MgO \cdot Al_2O_3$) occurring more prominently towards the center of the casting with small randomly dispersed pores. Also, a fine dispersion of corundum crystals are found within the spinel crystals. Thus, planes of concentrated weakness appear in a substantially lesser degree in this two-phase cast structure. When subjected to severe thermal shock, this magnesia-alumina refractory exhibits a substantially improved resistance to spalling.

While the addition of magnesia in fused cast alumina refractory has provided some improvement in thermal shock resistance, it has not been as much as desired in many applications, especially under conditions where thermal shock is quite severe. Thus, where the refractory is subjected to fairly rapid heating and cooling cycles, severe thermal stresses are developed and readily cause cracking in the weaker portions of the casting structure. With continuously repeated thermal cycling, these cracks grow and propogate through the casting thereby resulting in spalling of chunks or pieces of the casting.

It is an object of this invention to provide a fused cast alumina refractory that has an exceptionally high resistance to spalling when subjected to severe thermal shock.

It is another object of this invention to provide a fused cast alumina refractory having an outstanding ability to withstand fairly rapid and repeated temperature changes in the range between room temperature and about 1700° C. without cracking and spalling.

It is a further object of this invention to provide a fused cast alumina refractory characterized by a complete absence of mutually oriented elongated crystals of corundum in the casting.

It is a still further object of this invention to provide a fused cast alumina refractory article having an improved service life in applications where the article is subjected to thermal conditions that develop severe thermal stresses in the cast article.

Other objects and advantages of the present invention will become apparent, to those skilled in the art, from the following detailed description.

We have discovered that the foregoing objects can be attained by forming a molten mass of refractory consisting essentially of, in weight percent by oxide analysis, 0.4% to 7.5% CaO and the balance substantially all $Al_2O_3$, casting and cooling the molten refractory to form a solidified refractory casting or article. The microstructure of the casting exhibits an essentially wholly two-phase structure of very fine interlocking crystals, identified as corundum and calcium hexaluminate ($CaO \cdot 6Al_2O_3$), in a random distribution or orientation with very small pores being widely dispersed therein. Thus, the highly oriented structure, detrimental to thermal shock resistance, is avoided.

It is essential that substantially pure sources of alumina and calcium oxide to be used in order to avoid the formation of crystalline phases in the cast refractory that will detrimentally affect the good thermal shock resistance and service life of the refractory. Small amounts of MgO up to a maximum of 1.5% by weight of the refractory, can be tolerated without any significant adverse effect. However, the total of all other impurity constituents should not exceed 1% by weight of the refractory and, in particular, the $SiO_2$ and alkali oxide (e.g., $Na_2O$) should not exceed 0.5% each, by weight, to assure avoidance of undesirable crystalline and/or glassy silicate phases.

Commercially pure grades of alumina and calcium oxide that have been found to be suitable as raw batch materials are as follows (typical analysis in weight percent):

Alumina

| | Percent |
|---|---|
| $Al_2O_3$ | 99.2 |
| $Na_2O$ | 0.45 |
| $Fe_2O_3$ | 0.03 |
| $SiO_2$ | 0.02 |
| Other plus ignition loss | 0.3 |

Quicklime

| | |
|---|---|
| CaO | 95.0 |
| $SiO_2$ | 1.3 |
| MgO | 0.85 |
| $Al_2O_3$, $Fe_2O_3$ | 0.85 |
| Other | 0.7 |
| Ignition loss | 1.3 |

In the production of the cast refractory of the invention, the batch ingredients are first crushed into granular form if they are not commercially obtained already in that form. The batch materials are then proportioned in accordance with the desired composition for the refractory to be cast and are preferably premixed prior to charging into the melting furnace. Any of the well known melting furnaces can be used, such as the combustion gas type (i.e. utilizing the heat from combustion of a fluid carbonaceous fuel and air) or of the electric arc type. The latter type is preferred. The charge is then melted, cast into suitable preformed molds and annealed according to the known conventional techniques, for example, those disclosed in U.S. Patent 1,615,750 to G. S. Fulcher. Generally, the pouring temperature of the molten refractory is about 2030°–2050° C.

Four specific examples of our novel fused cast refractory, made in accordance with this invention from the aforementionad raw batch materials, are shown in Table I below:

TABLE I

| Refractory composition * (weight percent) | Thermal shock cycles |
|---|---|
| 0.6% CaO, balance $Al_2O_3$ | 13 |
| 2.0% CaO, balance $Al_2O_3$ | 22 |
| 4.0% CaO, balance $Al_2O_3$ | 44 |
| 6.0% CaO, balance $Al_2O_3$ | 44 |

*The "balance $Al_2O_3$" includes a maximum of 0.8% total impurities with $SiO_2$ less than 0.3% and $Na_2O$ less than 0.5%.

The thermal shock data is based on a rigorous test which consists of introducing a 1" x 1" x 3" sample into a furnace heated to 1650° C., holding the sample in the heat for 10 minutes and then removing it to cool to room temperature. This constitutes one cycle and this procedure is repeated until a piece of the sample has spalled off, at which point the number of cycles completed are noted. A cast refractory sample having outstanding thermal shock resistance generally will survice at least 10 cycles without spalling. As can be seen from Table I, our novel fused cast refractory possesses a very high degree of thermal shock resistance.

In order to better illustrate the improved character of our novel refractory, comparable data is shown in Table II for fused cast pure alumina and for fused cast alumina having additions of other alkaline earth metal oxides, based upon the abovementioned test.

TABLE II

| Refractory composition * (weight percent) | Thermal shock cycles |
|---|---|
| 100% $Al_2O_3$ | 1 |
| 0.67% MgO, balance $Al_2O_3$ | 9 |
| 2.0% MgO, balance $Al_2O_3$ | 5 |
| 4.0% MgO, balance $Al_2O_3$ | 2 |
| 4.0% BaO, balance $Al_2O_3$ | 7 |

*The "balance $Al_2O_3$" includes a maximum of 1.0% total impurities.

Comparing the data of Table II with that of Table I, it can be seen that our novel refractory possesses an exceptionally high degree of thermal shock resistance, a property which is not attainable in fused cast refractories like those shown in Table II. It is also notable that fused cast alumina refractory with other alkaline earth oxides that form a hexaluminate phase with alumina, such as BaO, in quantities equivalent to the CaO in our novel refractory, is characterized by a substantially lower degree of thermal shock resistance.

The maximum limit of 7.5% CaO in the refractory of this invention is particularly important and critical in obtaining a fused cast refractory having the requisite improved service life. The reason for this is that, as the CaO content increases beyond 7.5%, unstable crystalline phases occur in the casting at least partly due to non-equilibrium cooling conditions that conventionally occur. These unstable phases have been identified as calcium dialuminate ($CaO \cdot 2Al_2O_3$) and sometimes a phase corresponding to $3CaO \cdot 5Al_2O_3$. Upon heating and cooling in service, these crystals tend to combine with some of the corundum to form more calcium hexaluminate, and in the case of $3CaO \cdot 5Al_2O_3$ crystals, even some additional calcium dialuminate may be formed. We have found that this phase instability is accompanied by a phenomenon of permanent growth or volume expansion of the casting. As the phase changes continue to occur upon repeated heating and cooling of the refractory, the permanent growth continues in a ratchety manner and leads to the development of a bloated, lower density and weakened structure, which has a considerably reduced capability to withstand mechanical and thermal stresses.

Although the CaO content of our novel refractory can vary between the limits of 0.4% and 7.5%, by weight, we prefer to keep the CaO content in the range of 0.5% to 4%, by weight, for combined optimum characteristics of good thermal shock resistance, phase stable structure and good service life.

While the fused cast refractory of our invention is capable of many different applications, it is deemed particularly suitable for use in electric-arc, steel-melting furnace roofs, glass melting tank roofs, furnace checkers and high temperature metal annealing furnaces.

Although the present invention has been described with respect to specific details of certain embodiments thereof, it is not intended that such details be limitations upon the scope of the invention except insofar as set forth in the following claims.

What is claimed is:

1. A fused cast refractory having an exceptionally high degree of thermal shock resistance under conditions of relatively rapid and repeated temperature changes between about room temperature and about 1700° C., said refractory consisting essentially wholly of fine interlocking crystals of corundum and calcium hexaluminate.

2. A fused cast refractory having an exceptionally high degree of thermal shock resistance under conditions of relatively rapid and repeated temperature changes between about room temperature and about 1700° C., said refractory consisting essentially of, in weight percent by oxide analysis, $Al_2O_3$ and CaO wherein the CaO is present in an amount of 0.4% to 7.5%.

3. A fused cast refractory having an exceptionally high degree of thermal shock resistance under conditions of relatively rapid and repeated temperature changes between about room temperature and about 1700° C., said refractory consisting of, in weight percent by oxide analysis, 0.4% to 7.5% CaO, up to 1.5% MgO, up to 0.5% $SiO_2$, up to 0.5% alkali oxide, a total of all other impurities plus the $SiO_2$ and alkali oxide not exceeding 1% and the balance $Al_2O_3$.

4. A fused cast refractory having an exceptionally high degree of thermal shock resistance under conditions of relatively rapid and repeated temperature changes between about room temperature and about 1700° C., said refractory consisting essentially of, in weight percent by oxide analysis, $Al_2O_3$ and CaO wherein the CaO is present in an amount of 0.5% to 4%.

5. A fused cast refractory having an exceptionally high degree of thermal shock resistance under conditions of relatively rapid and repeated temperature changes between about room temperature and about 1700° C., said refractory material consisting of, in weight percent by oxide analysis, 0.5% to 4% CaO, up to 1.5% MgO, up to 0.3% $SiO_2$, up to 0.5% $Na_2O$, a total of all other impurities plus the $SiO_2$ and $Na_2O$ not exceeding 0.8% and the balance $Al_2O_3$.

References Cited by the Examiner

UNITED STATES PATENTS

| 2,075,694 | 3/1937 | Benner et al. | 106—62 |
| 2,474,544 | 6/1949 | McMullen | 106—63 |

TOBIAS E. LEVOW, Primary Examiner.

JOHN H. MACK, Examiner.